United States Patent [19]
Lesartre et al.

[11] Patent Number: 5,761,474
[45] Date of Patent: Jun. 2, 1998

[54] OPERAND DEPENDENCY TRACKING SYSTEM AND METHOD FOR A PROCESSOR THAT EXECUTES INSTRUCTIONS OUT OF ORDER

[75] Inventors: Gregg Lesartre, Fort Collins, Colo.; Ashok Kumar, Santa Clara, Calif.

[73] Assignee: Hewlett-Packard Co., Palo Alto, Calif.

[21] Appl. No.: 655,330

[22] Filed: May 24, 1996

[51] Int. Cl.⁶ ............................................... G06F 9/38
[52] U.S. Cl. ................................. 395/393; 395/392
[58] Field of Search ................................. 395/392, 393, 395/394, 395, 561, 562, 800.23

[56] References Cited

U.S. PATENT DOCUMENTS

| | | | |
|---|---|---|---|
| 4,287,561 | 9/1981 | Liptay | 395/393 |
| 5,345,569 | 9/1994 | Tran | 395/393 |
| 5,416,913 | 5/1995 | Grochowski et al. | 395/392 |
| 5,590,352 | 12/1996 | Zuraski, Jr. et al. | 395/800 |
| 5,625,789 | 4/1997 | Hesson et al. | 395/393 |

*Primary Examiner*—Parshotam S. Lall
*Assistant Examiner*—Viet Vu

[57] ABSTRACT

An operand dependency tracking system monitors operand dependencies, among instructions in a processor that executes instruction out of order. The processor has queues that are configured to execute the instructions out of order. An arithmetic queue (aqueue) executes arithmetic instructions and a memory queue (mqueue) executes memory instructions. The aqueue has aslots for receiving respective instructions. Each aslot includes a set dependency latch, a use dependency latch, valid operand (valop) propagation logic, and valid dependent (valdep) logic. The set dependency latch produces a set dependency signal that indicates whether a local instruction in a local slot is to produce operand data that is to be used by a remote dependent instruction that follows the local instruction in program order. The use dependency latch produces a use dependency signal that indicates whether the local instruction is to use operand data that is to be produced by a remote producer instruction that precedes the local instruction in the program order. The valop propagation logic in each local aslot produces a valop signal(s) that is forwarded to the immediately following adjacent aslot to indicate respectively whether or not a valid dependency (producer instruction) precedes the following aslot. The valid dependent logic is configured to prevent the local instruction from launching execution until after the remote producer instruction commences execution, based upon the local use dependency signal and the valid operand signal(s) from the previous slot. In this way, dependencies are set and cleared in a propagation manner, rather than in a broadcast manner.

28 Claims, 8 Drawing Sheets

OPERAND DEPENDENCY TRACKING SYSTEM AND METHOD FOR A PROCESSOR THAT EXECUTES INSTRUCTIONS OUT OF ORDER

FIELD OF THE INVENTION

The present invention generally relates to computer processors that execute instructions out of order, and more particularly, to a system and method for tracking operand dependencies among instructions in a processor that executes instructions out of order. The system and method is particularly suited to track carry borrow (cb) and shift amount register (sar) operand dependencies.

BACKGROUND OF THE INVENTION

A computer processor (processing unit) generally comprises a control unit, which directs the operation of the system, and an arithmetic logic unit (ALU), which performs computational operations. The design of a processor involves the selection of a register set(s), communication passages between these registers, and a means directing and controlling how these operate. Normally, a processor is directed by a program, which includes of a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scalar operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves instruction dependencies. An instruction, called the "dependent" instruction, is dependent upon another instruction, called the "producer" instruction, when the dependent instruction operates upon an operand or result that is produced from the producer instruction.

As an example, consider an addition operation that has a carry borrow (cb) value that must be transferred from one instruction to another. In this regard, suppose a 64 bit addition is to be accomplished, and the computer is a 32 bit machine. In this scenario, a cb bit must be transferred from the first operation and applied to the second operation.

As another example, consider a shift amount register (sar) operation that involves a control register. A dependent instruction must wait until its producer instruction manipulates the register value.

Generally, dependent instructions are placed after their producer instructions in program order, and therefore, in a typical processor that executes instructions in order, the dependent instructions are executed after their producer instructions. However, in a processor that executes instructions out of order, unless safeguards are implemented, it is possible that a dependent instruction may be executed prior to the producer instruction from which it depends.

SUMMARY OF THE INVENTION

The invention provides an operand dependency tracking system that tracks operand dependencies, such as carry borrow (cb) or shift amount register (sar) dependencies, among instructions in a processor that executes instruction out of order. The operand dependency tracking system is implemented as follows.

The processor that implements the operand dependency system has an instruction reordering mechanism that is configured to receive and execute the instructions out of order. In the preferred embodiment, the reordering mechanism includes an arithmetic queue (aqueue) that executes arithmetic instructions and a memory queue (mqueue) that executes memory instructions.

The aqueue has a plurality of arithmetic instruction processing mechanisms, or arithmetic slots (aslots), for receiving respective instructions. Each aslot includes a set dependency latch, a use dependency latch, valid operand (valop) propagation logic, and valid dependent (valdep) logic. The set dependency latch produces a set dependency signal that indicates whether a local instruction in a local slot is to produce operand data that is to be used by a remote dependent instruction that follows the local instruction in program order. The use dependency latch produces a use dependency signal that indicates whether the local instruction is to use operand data that is to be produced by a remote producer instruction that precedes the local instruction in the program order. The valop propagation logic in each local aslot produces a valop signal(s) that is forwarded to the immediately following adjacent aslot to indicate respectively whether or not a valid dependency precedes the following aslot, i.e., whether or not a producer instruction is still unretired in program order prior to the following instruction in the following aslot. The valid dependency logic is configured to prevent the local instruction from launching execution until after the remote producer instruction commences execution, based upon the local use dependency signal and the valid operand signal(s) from the previous slot. In this way, dependencies are set and cleared in a propagation manner, rather than in a broadcast manner.

In the preferred embodiment, the valop signal is utilized during insert and retirement of instructions to and from the aqueue. On insert, the valop signal indicates to the newly inserted instruction whether or not it is dependent upon a previous instruction in the aqueue. Further, on retirement of a producer instruction, the valop signal is deasserted and propagated, so that any corresponding dependent instructions are notified that their dependency has cleared.

The invention can be practiced by utilizing only the valop signal or an equivalent; however, a dependent instruction would in general need to wait for its producer instruction to retire before commencing execution. Therefore, in order to further enhance performance, a second valid operand signal (in the preferred embodiment, valcb[0] in the case of a cb operand dependency and valsar[0] in the case of a sar operand dependency) is propagated from aslot to aslot so that dependent instructions are advised of a dependency clearing prior to retirement of their producer instructions. In other words, when a producer instruction executes, but has not yet retired, then the second valid operand signal is asserted and propagated to advise any dependent instructions. Finally, the a third valid operand signal (in the preferred embodiment, valcb[1] in the case of a cb operand dependency and valsar[1] in the case of a sar operand dependency) is asserted and deasserted from aslot to aslot for controlling propagation of the second valid operand signal.

The invention can also be conceptualized as providing a novel method for tracking operand dependencies among instructions in a processor that executes the instructions out of order. This method is applicable to a processor comprising a plurality of slots that receive respective instructions and permit the instructions to execute out of order. In a broad sense, the method can be summarized as follows: (a) determining that a first instruction in a first slot produces an operand that is to be used by a second instruction in a second slot, the second instruction following the first instruction in program order; (b) propagating a dependency signal successively through the slots from the first slot to the second slot; and (c) when the second slot receives the dependency signal, preventing the second instruction from launching execution, until after the first instruction launches execution so that the first and second instructions execute substantially concurrently.

The invention has numerous advantages, a few of which are delineated hereafter, as merely examples.

An advantage of the invention is that operand dependencies, such as cbs and sars, are tracked with less hardware and space requirements than would be required with a broadcast dependency clearing system.

Another advantage of the invention is that it provides for both cb and sar dependency clearing by utilizing substantially the same hardware design for each.

Another advantage of the invention is that it provides for reliable dependency tracking.

Another advantage of the invention is that a slot tag is propagated in a similar fashion as the dependency signal, which saves broadcast logic and tag comparators to gather the dependent tag on insertion of the instruction and dependency clearing on launch of the producer instruction.

Another advantage of the invention is that a signal can be broadcast to all slots to indicate that no instruction exists in the queue that modifies the requested resource. This provides a mechanism to free all dependencies that might continue in the queue, due to the propagating status of dependency notification, thereby enhancing performance via a bypass of the dependency mechanism.

Another advantage of the invention is that it is simple in design and easily implemented in mass production of processors.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

Figure 1:
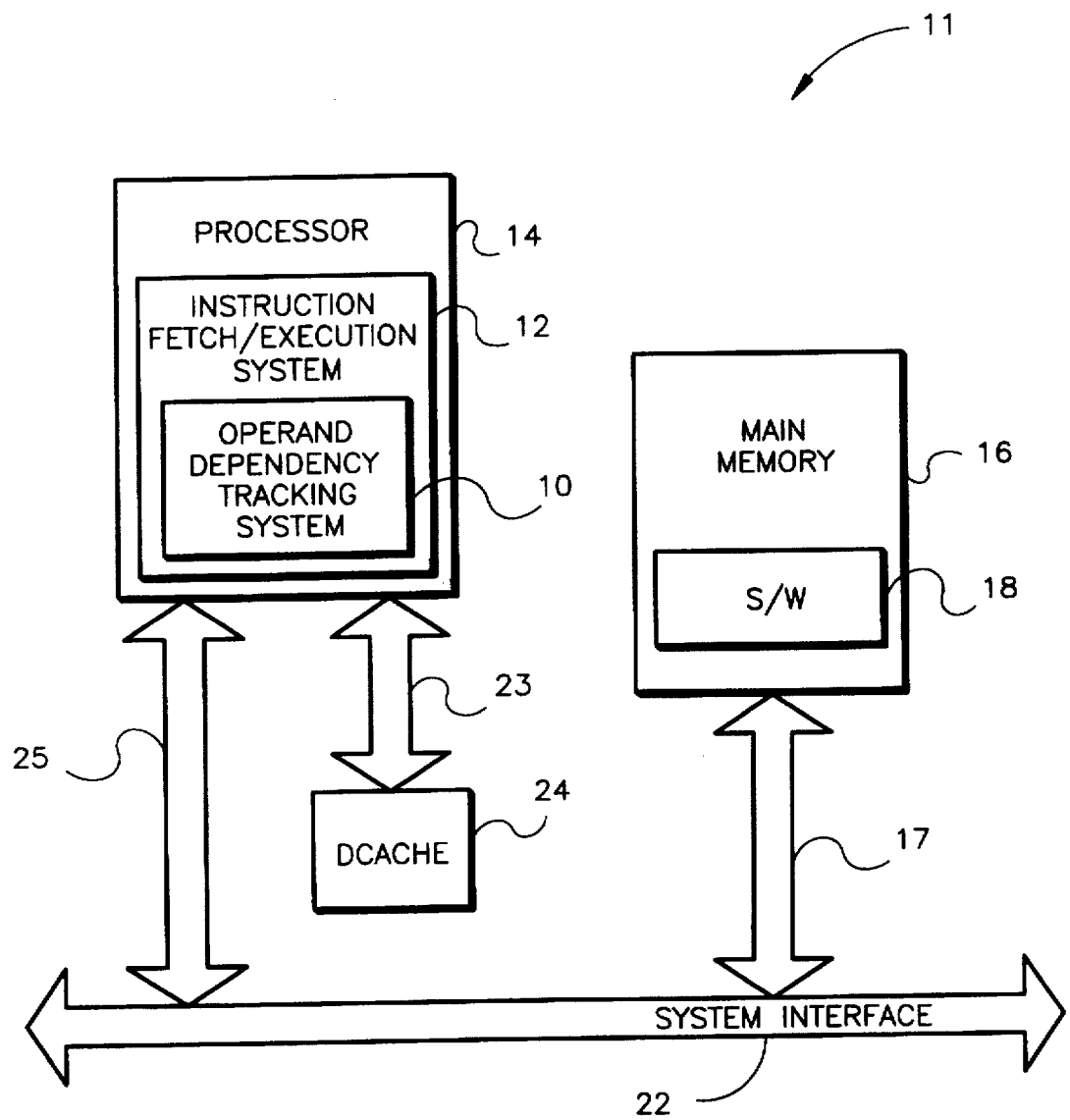
FIG. 1 is a block diagram of an example of a computer that can implement the operand dependency tracking system and method of the invention.

As shown in FIG. 1, the operand dependency tracking system 10 and associated methodology of the present invention is implemented within a computer 11, and particularly, within a fetch/execution system 12 within a processor 14 of the computer 11. The processor 14 is configured to execute instructions out of order, and the operand dependency tracking system 10 tracks operand dependencies, for example, carry borrow (cb) dependencies and shift register amount (sar) dependencies, associated with instructions in software (s/w) 18 so that dependent instructions are not executed prior to execution of their corresponding producer instructions.

The computer 11 generally comprises the processor 14 that executes instructions out of order, a main memory 16, such as a dynamic random access memory (DRAM), having the software 18 for driving the processor 14, a data cache 24 (dcache) interconnected with the processor 14 as indicated by reference arrow 23, and a system interface 22, such as one or more buses, interconnecting the processor 14 and the main memory. As the instruction fetch/execution system 12 in the processor 14 executes the software 18, data that is in current use in the processor 14 is moved into the dcache 24, thereby reducing the average access time for the processor's memory requests and minimizing traffic on the system interface 22. It should be mentioned that, with the exception of the operand dependency tracking system 10 and its associated methodology, all of the aforementioned computer components and their functionality are well known and understood in the art.

Figure 2:
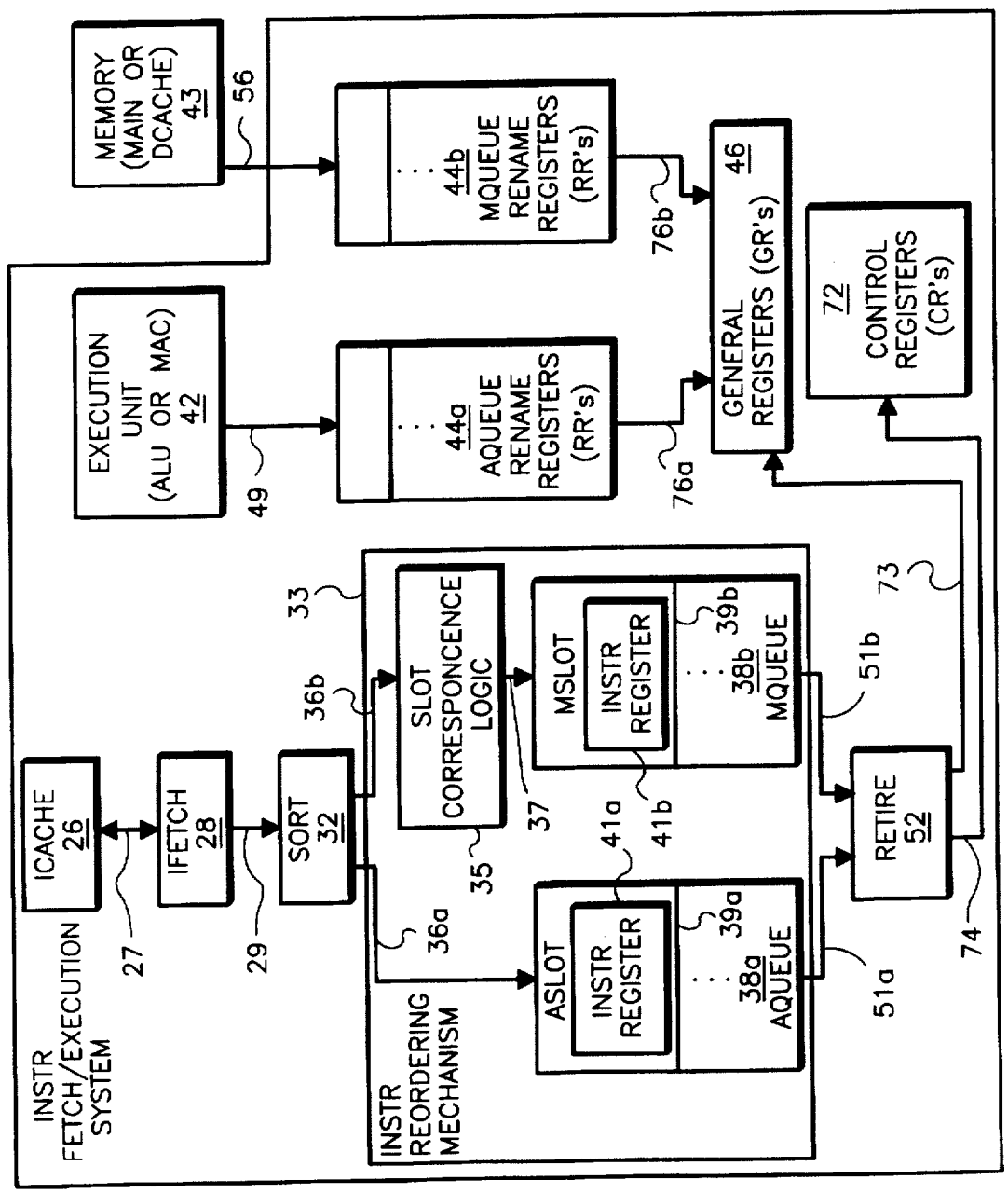
FIG. 2 is a block diagram of a possible implementation of the instruction fetch/execution system of FIG. 1.

A possible implementation of the instruction fetch/ execution system 12 is illustrated by way of block diagram in FIG. 2. As shown in FIG. 2, the instruction fetch/ execution system 12 has an instruction cache (icache) 26 for storing instructions from the software 18 (FIG. 1). An instruction fetch mechanism (ifetch) 28 communicates with the instruction cache 26 and retrieves instructions from the cache 26 for ultimate execution. In the preferred embodiment, the ifetch mechanism 28 fetches four instructions, each being 32 bits, at a time and transfers the instructions to a sort mechanism 32.

From the sort mechanism 32, the instructions are sent to a suitable reordering mechanism, such as a queue(s) or reservation station(s). In the preferred embodiment, the instructions are sorted and distributed, or "inserted," into an arithmetic logic unit (ALU) queue (aqueue) and a memory queue (mqueue), depending upon the operation to be accomplished by each instruction. More specifically, the sort mechanism 32 receives the instructions from the ifetch mechanism 28 and determines whether each instruction is directed to an operation involving either (a) an arithmetic execution unit 42 (i.e., either an arithmetic logic unit (ALU) for integer operations or a multiple accumulate unit (MAC) for floating point operations) or (b) the memory 43 (i.e., the dcache 24 or the main memory 16). The sort mechanism 32 distributes arithmetic and memory instructions along respective paths 36a and 36b that are ultimately destined for the aqueue 38a and the mqueue 38b, respectively.

The aqueue 38a contains a plurality (28 in the preferred embodiment) of aslots 39a that have registers 41a for storing respective instructions that are directed to provoking operations at one or more (2 in the preferred embodiment) arithmetic logic units 42. The arithmetic instructions in the aqueue 38a are executed in any order possible (preferably, in data flow fashion). When execution of an instruction is commenced in either the aqueue 38a or the mqueue 38b, then the instruction is said to have "launched." The execution unit 42 retrieves one or more operands from rename registers (RRs) 44a, 44b and general registers (GRs) 46, pursuant to each instruction, and operates upon the operands. As an instruction completes operation upon operands, the results are captured by the aqueue RRs 44a, as indicated by reference arrow 49 and the instruction is marked as complete in the particular aslot 39a of the aqueue 38a. In the preferred embodiment, the aqueue 38a receives up to four instructions (32 bits each) per cycle from the sort mechanism 32 and transfers up to two instructions (preferably, 32 bits each) per cycle to a retire mechanism 52, as indicated by reference arrow 51a.

With respect to instructions that are directed to the mqueue 38b, the instructions are passed through a slot correspondence logic 35, which can be any suitable logic or state machine, for ensuring that the program order of the instructions can be tracked, notwithstanding the separate queues 38a, 38b. Essentially, the instructions are placed in respective slots (aslot, mslot) 39a, 39b within the aqueue 38a and mqueue 38b, and the slot correspondence logic 37 ensures that successive instructions can be tracked for prediction and nullification purposes.

The mqueue 38b contains a plurality (28 in the preferred embodiment) of mslots 39b. Each mslot 39b includes a register 41b for storing a respective memory instruction. Memory instructions in the mqueue 38b can be classified as "loads" and "stores" to memory. A "load" is a request to transfer data from memory 43 (the dcache 24 or the main memory 16) to a register, whereas a "store" is a request to transfer data from a register to memory 43.

During execution of a memory instruction, a first phase involves executing a prescribed mathematical operation on operands with an address calculator (not shown for simplicity) in order to compute an address, and a second phase involves accessing the memory 43 (the main memory 16 or the dcache 24) for data based upon the calculated address. The mqueue 38b executes each of the instructions by performing each of the aforementioned two phases in any order possible (preferably, in data flow fashion). As the memory instructions complete, the results are captured by the mqueue RRs 44b, as indicated by reference arrow 56, and the completed instruction is marked as complete in the mqueue 38b. In the preferred embodiment, the mqueue 38b receives up to four instructions (32 bits each) per cycle from the sort mechanism 32 and transfers up to two instructions (32 bits each) per cycle to the retire mechanism 52, as indicated by reference arrow 51b. For information concerning a preferred method for execution of memory instructions by the mqueue 38b, see copending application entitled "Store-To-Load Hazard Recovery System And Method For A Processor That Executes Instructions Out Of Order," filed on Mar. 1, 1996, and assigned Ser. No. 08/609,581, the disclosure of which is incorporated herein by reference. For more information concerning a preferred method for performing memory accesses pursuant to instruction execution, see copending application entitled "Address Aggregation System And Method For Increasing Throughput Of Addresses To A Data Cache Of A Processor," filed on Mar. 1, 1996, and assigned Ser. No. 08/609,821, the disclosure of which is incorporated herein by reference.

The retire mechanism 52 receives executed instructions (preferably, two 32-bit words per cycle) from each of the queues 38a, 38b. The retire mechanism 52 commits the instruction results to the architecture state. When the retire mechanism 52 commits an instruction's results to the architecture state or when the retire mechanism 52 ignores the results of an instruction that has been nullified in one of the queues 38a, 38b, then the retire mechanism 52 is said to have "retired" the instruction. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a GR 46 and/or a control register 72, as indicated by respective reference arrows 73, 74, depending upon the instruction's attributes, and causes the results of the instructions to be passed from the RRs 44a, 44b to the GRs 46, as indicated by the reference arrows 76a, 76b.

Figure 3:
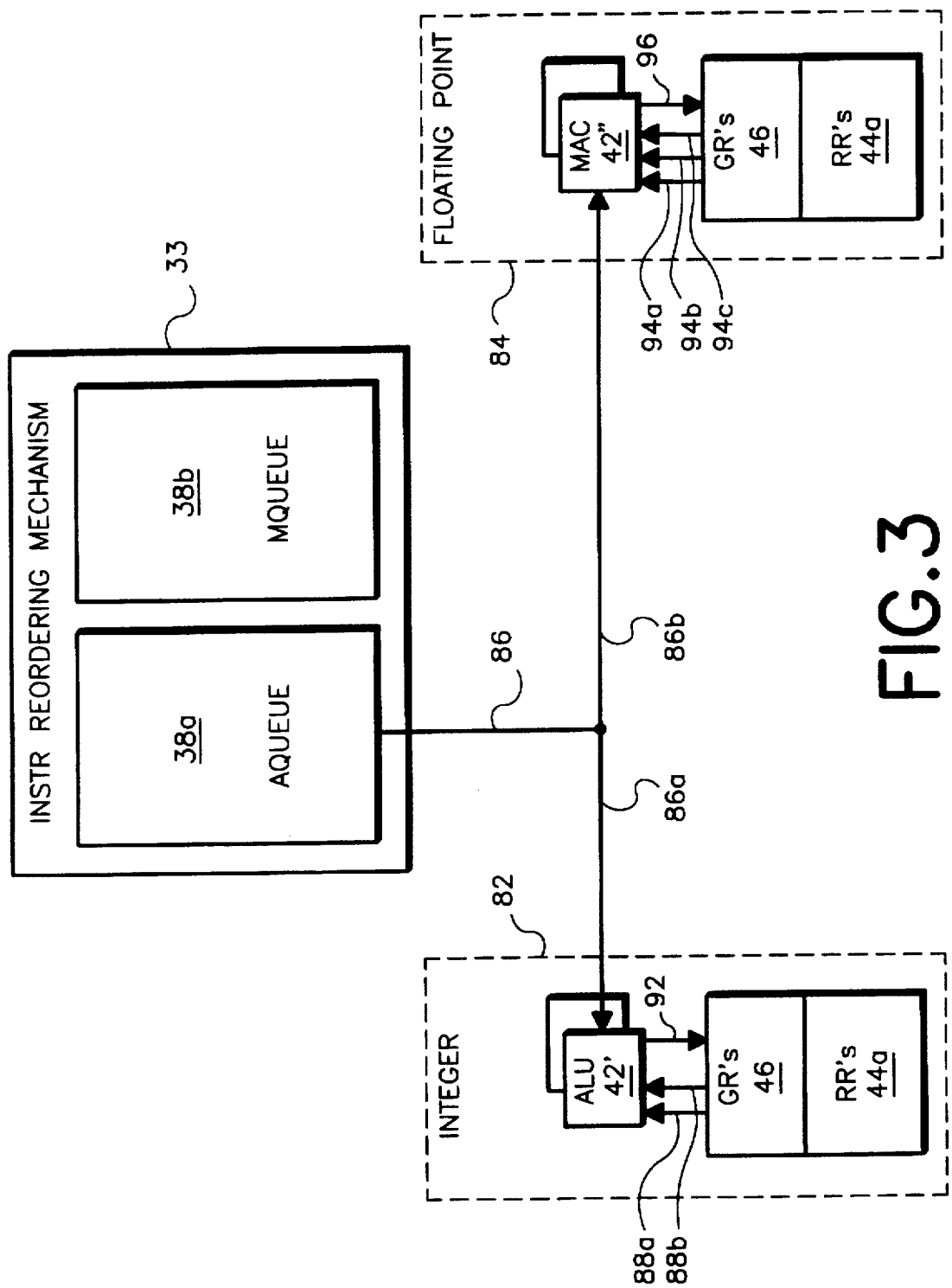
FIG. 3 is a block diagram of a possible implementation of data paths from the arithmetic queue (aqueue) to the execution unit (i.e., ALUs and MACs) of FIG. 2.

With regard to arithmetic instruction execution, the integer and floating point data paths 82, 84 of the instruction fetch/execution system 12 of FIG. 2 are illustrated in FIG. 3. As shown in FIG. 3, arithmetic instructions from the aqueue 38a are broadcast to the integer data path 82 and the floating point data path 84, as indicated by reference arrows 86a, 86b, respectively. One of the data paths 82, 84 operates upon the arithmetic instruction, depending upon whether the instruction involves an integer operation or a floating point operation.

In the preferred embodiment, more than one, preferably two, instructions are forwarded to the integer data path 82 as well as the floating point data path 84 during each cycle. Accordingly, two ALUs 42' are present in the integer data path 82 and two MACs 42" are present in the floating point data path 83 for concurrently executing respective instructions.

In the case of an arithmetic instruction dealing with an integer operation, the instruction is executed by an ALU 42'. When each ALU 42' processes its respective instruction, the ALU 42' reads up to two operands from the GRs 46 and/or the aqueue RRs 44a, as indicated by reference arrows 88a, 88b. The ALU 42' then operates upon the operands to generate a result that is written to, or forwarded to, the aqueue RRs 44a, as indicated by reference arrow 92.

In the case of a floating point arithmetic instruction, the instruction is forwarded to the MAC 42". When each MAC 42" processes an instruction, the MAC 42" reads up to three operands from the GRs 46 and/or the aqueue RRs 44a, as indicated by reference arrows 94a, 94b, 94c. The MAC 42" then operates upon the operands and generates a result that is written to, or forwarded to, the aqueue RRs 44a, as indicated by reference arrow 96.

Figure 4:
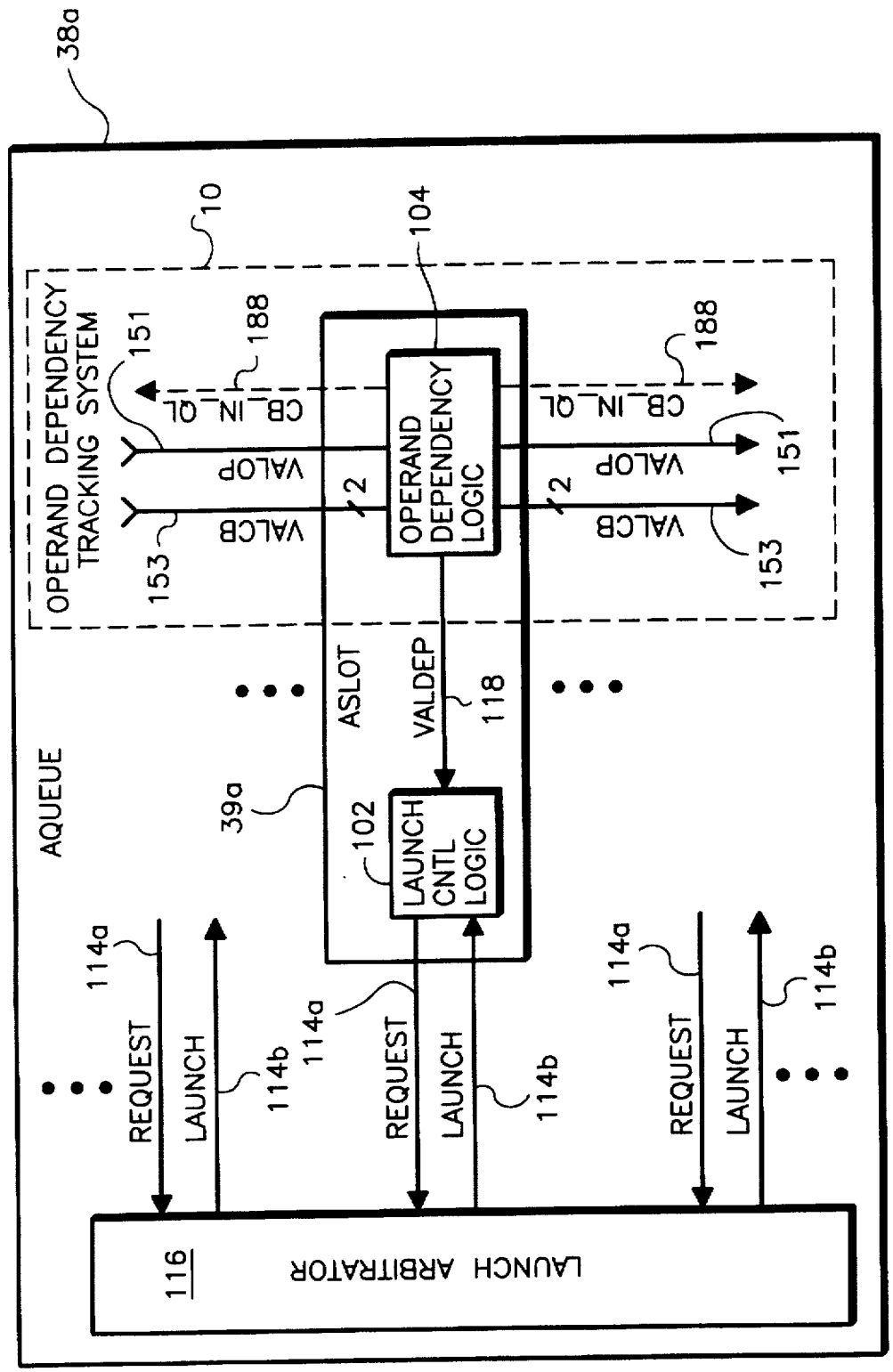
FIG. 4 is a block diagram of a possible implementation of the aqueue of FIGS. 2 and 3 wherein the aqueue includes operand dependency logic for tracking operand dependencies in accordance with the operand dependency tracking system of FIG. 1.

In accordance with the operand dependency tracking system 10 (FIG. 1) of the invention, as shown in FIG. 4, each one of the aslots 39a in the aqueue 38a comprises launch control logic 102 and operand dependency logic 104. The launch control logic controls whether and when an instruction in the aslot 39 will launch, or will be passed to an execution unit 42 (FIG. 2; ALU 42' or MAC 42" in FIG. 3) for execution thereof. The launch control logic 102 generates a request signal 114 that is passed to a launch arbitrator 116.

The launch arbitrator 116 receives, prioritizes, and grants requests 114 from the various aslots 39a. The launch arbitrator 116 can be implemented with any suitable logic or state machine. In the preferred embodiment, requests are prioritized based upon longevity in the aqueue 38a; however, other priority schemes are possible and may be utilized. When a particular aslot 39a is to be granted the ability to launch, the launch arbitrator 116 passes a launch signal 114b to the launch control logic 102 of the aslot 39a.

The operand dependency logic 104 tracks instruction operand dependencies involving, for example, cb operands and/or sar operands. The operand dependency logic 104 generates a valid dependency (valdep) signal 118 for the launch control logic 102 to indicate whether or not the local instruction associated with the aslot 39a is dependent upon an earlier producer instruction in the aqueue 38a. When the valdep signal 118 is asserted, the launch control logic 102 will refrain from issuing a launch request 114a to the launch arbitrator 116. When the valdep signal 118 is deasserted, then the launch control logic 102 will make a launch request 114a to the arbitrator 116, subject to any other dependencies delaying launch.

For purposes of simplicity, the details of the operand dependency logic 104, and particularly, signal identifications, will be described hereafter in relation to a "cb" operand dependencies, not "sar" dependencies. However, it should be noted that the discussion is equally applicable to sar dependencies and, generally, the sar hardware is essentially the same design as the cb hardware. Moreover, for sar signal identifications and components, merely replace "cb" with "sar" in the signal designations as set forth hereafter and in the figures.

As will be further described in detail later in this document, the operand dependency logic 104 propagates signals successively through the aslots 39a in order to apprise aslots 39a of the existence of operand dependencies and the status thereof. With this propagation technique, operand dependencies, such as cbs and sars, are tracked with less hardware and space requirements than would be required with broadcast dependency clearing system.

Figure 6:
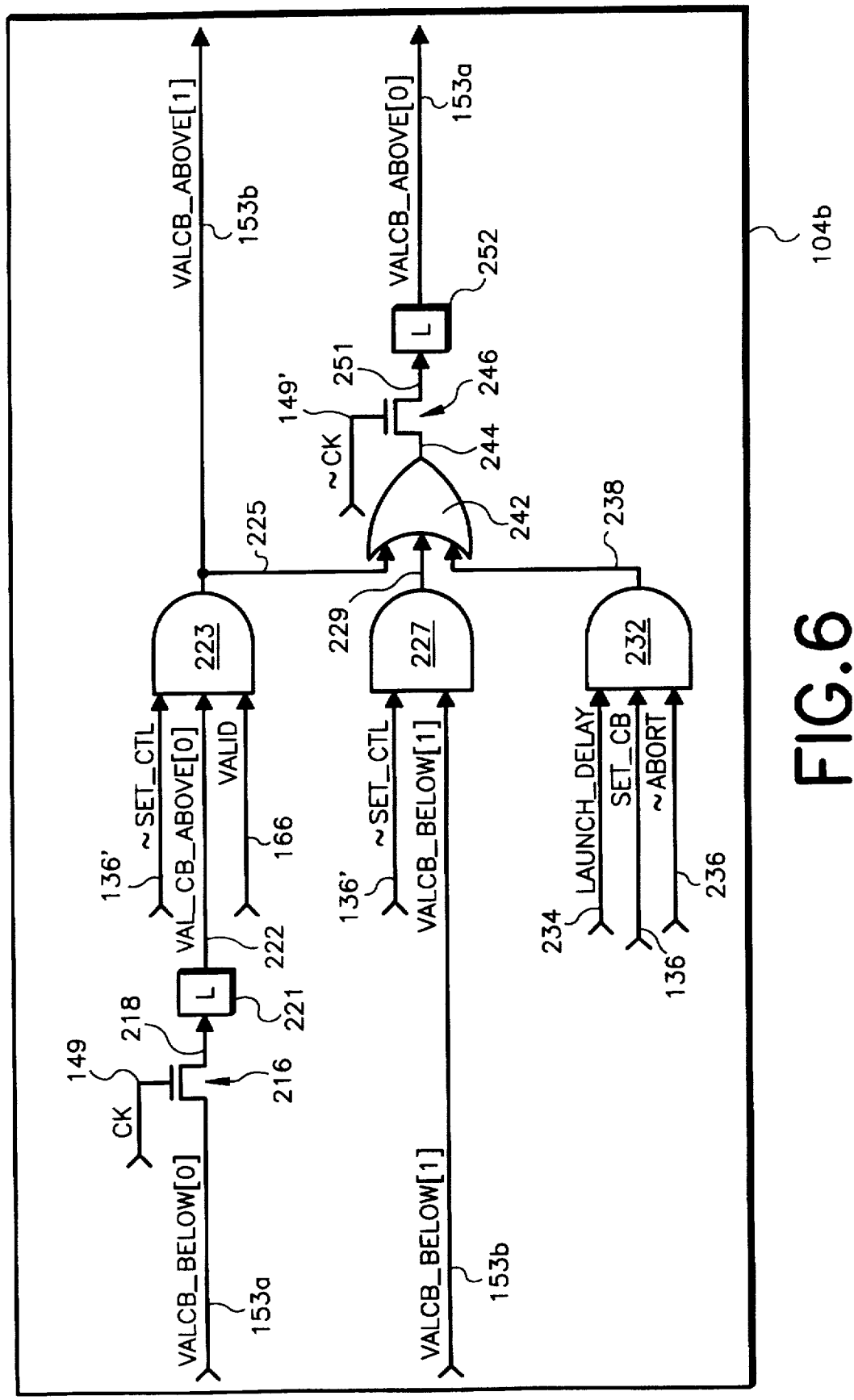
FIG. 6 is a block diagram of a possible implementation of valid carry borrow (valcb) logic situated within the operand dependency logic of FIG. 4 for propagating a valcb signal throughout the aqueue of FIGS. 2 and 3.

Relative to this propagation technique and cb operand dependencies, each operand dependency logic 104 communicates valid operand (valop) and valid carry borrow (valcb) signals 151, 153 to the next successive operand dependency logic 104 in an adjacent aslot 39a so that circular propagation paths are established among the aslots 39a in the aqueue 38a. The valcb signals 153 comprise a valcb[0] signal 153a (FIG. 6) and a valcb[1] signal 153b (FIG. 6).

In the preferred embodiment, the valop signal 151 is utilized during insert and retirement of instructions. On insert, the valop signal 151 indicates to the newly inserted instruction whether or not it is dependent upon a previous instruction in the aqueue 38a. Further, on retirement of a producer instruction, the valop signal 151 is deasserted and propagated, so that any corresponding dependent instructions are notified that their dependency has cleared.

The invention can be practiced by utilizing only the valop signal 151 or an equivalent; however, a dependent instruction would need to wait for its producer instruction to retire before commencing execution. Therefore, in order to further enhance performance, the valcb[0] signal 153a is implemented so that dependent instructions are advised of a dependency clearing prior to retirement of their producer instructions. In other words, when a producer instruction executes, but has not yet retired, then the valcb[0] signal 153a is asserted and propagated to advise any dependent instructions. Furthermore, the valcb[1] signal 153b is asserted and deasserted for controlling propagation of the valcb[0] signal 153a.

Optionally, as further shown in FIG. 4 by phantom lines, a cb_in_ql connection 188 may be employed by the operand dependency tracking system 10 to broadcast (as opposed to propagate from one aslot to another) a not-cb-in-queue signal 188 (cb_in_ql; active low) concurrently to all aslots 39a in order to indicate whether or not a producer instruction exists at all in the aqueue 38a. This feature provides a mechanism to free all dependencies that might continue in the aqueue 38a, due to the propagating status of dependency notification, thereby enhancing performance via a bypass of the dependency propagation mechanism.

The specific details of a possible implementation of the operand dependency logic 104 will now be described with reference to FIGS. 5, 6, and 7, which show respectively a valdep/valop logic 104a, valcb logic 104b, and slot identification tag logic 104c.

Figure 5:
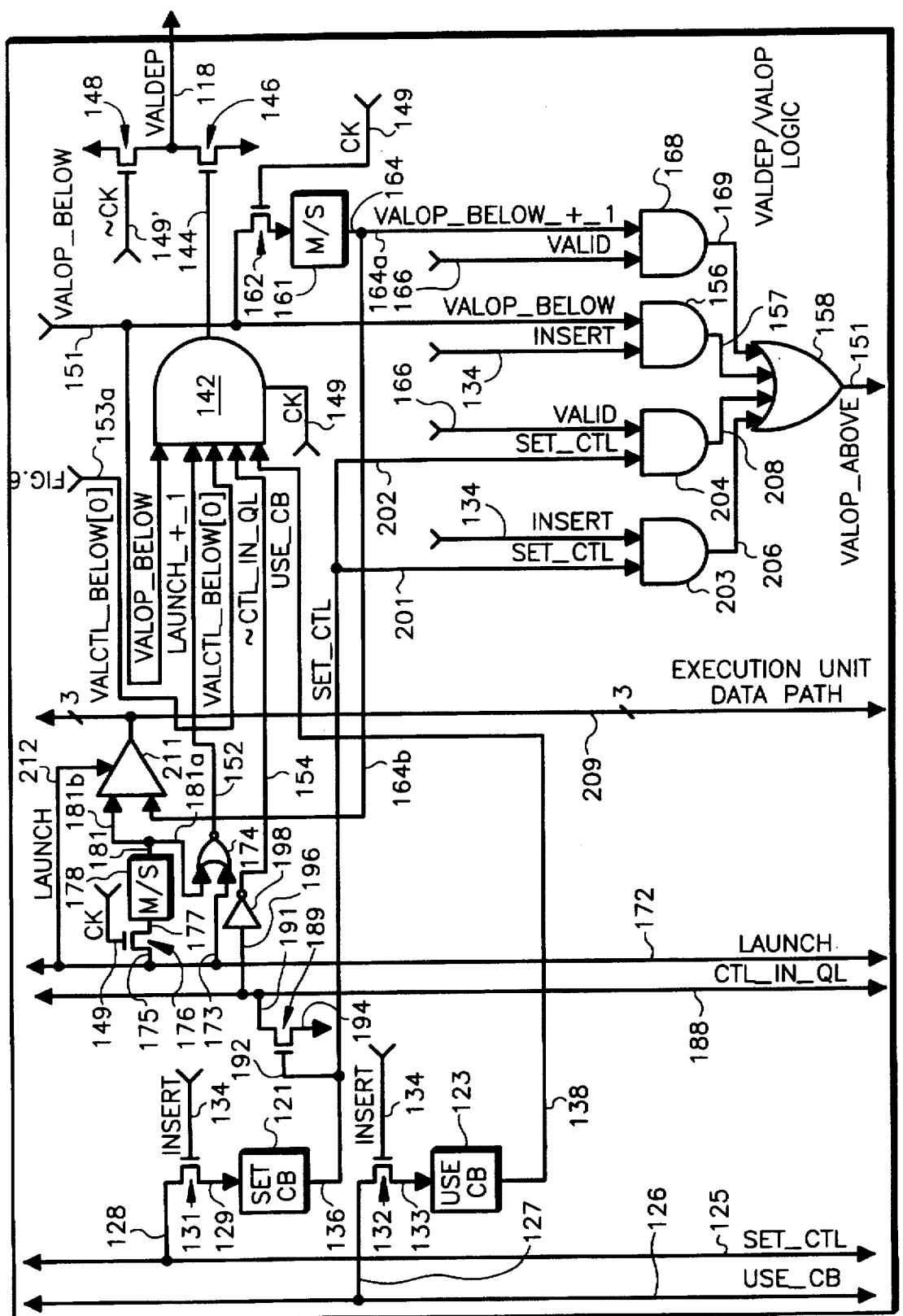
FIG. 5 is a block diagram of a possible implementation of valid-dependency/valid-operand (valdep/valop) logic situated within the operand dependency logic of FIG. 4 for setting and clearing dependencies.

With reference to FIG. 5, the valdep/valop logic 104a is designed to set and clear dependencies in its corresponding aslot 39a. The valdep/valop logic 104a includes a set_cb indicator 121 and a use_cb indicator 123. The set_cb indicator 121 and the use_cb indicator 123 can be any suitable logic storage device, including for example, a latch or register. Both of these indicators 121, 123 are set upon insert of an instruction into the local aslot 39a by the sort mechanism 32 via successively the following: respective set_cb and use_cb connections 125, 126 from the sort mechanism 32, respective connections 127, 128, and respective transistors 131, 132, which are actuated by an insert signal 134. The insert signal 134 is generated by the aslot control logic.

The set_cb indicator 121 generates a set_cb signal 136 that indicates whether or not the local instruction is a producer instruction, i.e., whether the local instruction will generate a cb operand for a remote dependent instruction. The set cb_signal 136 does not prevent a launch of the local instruction, but merely serves to ultimately generate the valop signal 151 and the valcb signals 153 to advise a remote dependent instruction of the dependency and its status.

The use_cb indicator 123 generates a use_cb signal 138 that indicates whether or not the local instruction is dependent upon a producer instruction in the aqueue 38a. When the use_cb signal 138 is asserted, the valdep signal 118 (active when low) can be asserted, provided that there is a valid dependency, or producer instruction, in the aqueue 38a as indicated by signals 151, 152, 153a, and 154 that will be further described.

More specifically, an AND logic gate 142 controls assertion and deassertion of the valdep signal 118 via an output 144 that actuates a transistor 146 based upon inputs to the AND logic gate 142. The valdep signal 118 is clocked, or precharged, to a high logic state via a transistor 148 and a not clock signal (~CK) 149'. In the preferred embodiment, the valdep signal 118 is asserted when it is pulled low, or discharged, and deasserted when it remains precharged. The AND logic gate 142, which is clocked by the clock signal (CK) 149, receives the following inputs: the valop signal 151 that indicates whether or not a valid operand dependency exists in the aqueue 38a, a launch counter signal (launch_+_1) 152 that indicates whether or not the timing is at a point somewhere within the same or first cycle after the instruction in the previous adjacent slot has launched, the valcb[0] signal 153a that indicates whether or not the cb operand that is required is available yet, the ~cb_in_ql signal 154 that indicates whether or not a dependency exists at all in any of the aslots 39a of the aqueue 38a, and the use_cb signal 138 that indicates whether or not the local instruction is dependent upon a cb operand. When all the foregoing signals are asserted, then the AND logic gate 142 will cause assertion of the valdep signal 118 to the launch control logic 102 in order to stall the launching of a local instruction. Furthermore, when any of the foregoing inputs is deasserted, then the valdep signal 118 is not asserted, and the launch control logic 102 is permitted to make a launch request 114a (FIG. 4) to the launch arbitrator 116 (FIG. 4), provided that all other dependencies have cleared.

The valop signal 151 is received from an adjacent aslot 39a and indicates, in general, whether there is a dependency in the aqueue 38a that affects the local instruction. The valop signal 151 can be asserted on insert of the local instruction and deasserted by the previous adjacent aslot 39a. The valop signal 151 is propagated to the next adjacent aslot 39a from the local aslot 39a during the cycle of insertion of the local instruction via an AND logic gate 156 and OR logic gate 158. This architecture enables the valop signal 151 to be propagated up to four aslots 39a at a time, which corresponds with the up to four instructions that may be inserted into the queue 39a at a time.

The valop signal 151 is also clocked into a master/slave (m/s) latch 161 by way of a transistor 162, which is clocked by the clock CK 149. This path is utilized for clearing a dependency and enables the deasserted (clearing) valop signal 151 to be propagated at a rate of one aslot 39a per cycle, unlike the propagation of an asserted valop signal 151, which can travel up to four aslots 39a. The latch 161 outputs a delayed valop signal (valop_below_+_1) 164 that is combined with a valid signal 166 at an AND logic gate 168. The valid signal 166 is asserted or deasserted to indicate whether or not a valid instruction exists in the local aslot 39a. The AND logic gate 168 produces an output 169 that is passed to the OR logic gate 158. As mentioned, the OR logic gate 158 produces the valop signal 151 that is passed to the next adjacent aslot 39a.

The launch_+_1 signal 152 is ultimately generated from a launch signal 172 that is received from a previous adjacent aslot 39a. The launch_+_1 signal 152 is asserted during the cycle of and first cycle after the launch signal 172 is received from the previous adjacent aslot 39a; otherwise, it is deasserted. In order to accomplish this functionality, the launch signal 172 is passed to a NOR logic gate 174 and also to a transistor 176. The transistor 176 is actuated by the clock CK 149, which provides the state of the launch signal 172 to the m/s latch 178. The output 181 of the latch is passed to the NOR logic gate 174, as indicated by reference arrow 181a.

The valcb[0] signal 153a is generated by the previous aslot 39a to indicate whether the dependency (the cb producer instruction) has cleared or not. The state of the valcb signal 153a propagates from aslot 38a to aslot 38a. Generation of the valcb[0] signal 153a as well as the valcb[1] signal 153b will be described in further detail later in connection with FIG. 6.

The ~cb_in_ql signal 154 is generated ultimately from the cb_in_ql signal 188. The cb_in_ql signal 188 is initially deasserted by being precharged high on clock ~CK and can be asserted by being pulled low on clock CK by an aslot 39a when the aslot 39a contains a producer instruction. This signal 188 is broadcast to all aslots 39a so that each is aware that there is or is not a dependency. If there is no dependency in the entire queue 38a, then each aslot 39a can launch without having to wait for propagation of the valcb [0] signal 153a through the various aslots 39a of the aqueue 38a. In order to assert the cb_in_ql signal 188, each aslot 39a is equipped with a transistor 189 connected between the cb_in_ql connection 188 and the set_cb connection 136 via respective connections 191, 192. The cb_in_ql connection 188 is communicated by way of a connection 196 to an inverter 198 that outputs the ~cb_in ql signal 154. Accordingly, when the set_cb signal 136 is deasserted in all of the aslots 39a, then all of the valdep signals 118 from the aslots 39a are prevented from being asserted. This provides a mechanism to free all dependencies that might think they are still alive in the aqueue 38a due to the propagating status, thus bypassing the operand dependency logic 104. Hence, an aslot 39a can launch immediately if no aslot 39a in the queue 38a is a cb producer instruction.

The local aslot 39a will propagate an asserted valop signal 151 to the next aslot 39a under a couple of circumstances. If the set_cb signal 136 is asserted upon insert of a local instruction, then the local aslot 39a will propagate an asserted valop signal 151 to the next aslot 39a via AND logic gate 203 and the OR logic gate 158. If the set_cb signal is asserted and there is a valid instruction in the local aslot 39a, then the local aslot 39a will maintain an asserted valop signal 151 to the next aslot 39a via AND logic gate 204 and the OR logic gate 158. The valop signal 151 is propagated from aslot 39a to aslot 39a to indicate that there is a dependency in the aqueue 38a.

Upon insert of the instructions into the aqueue 38a, the valop signal 151 is permitted to propagate up to four aslots and, afterward, when the local aslot 39a retires, valop signal 151 is deasserted and is propagated one aslot 39a per cycle thereafter. The foregoing limitation is implemented for reliability reasons. In essence, the valop signal 151 indicates to an aslot 39a whether or not there is a producer instruction in front of its instruction.

An execution unit data path 209 is connected between the execution unit 42 (FIG. 2) and each of the aslots 39a. Each aslot 39a includes a driver 211 that is actuated by the local launch signal 172, as indicated by reference arrow 212. When actuated, the driver 211 passes the delayed valop signal 164b and the latch signal 181b to the execution unit 42 via the data path 209. The aforementioned data is utilized by the execution unit 42 to route the correct version of the cb operand to the execution unit 42. The delayed valop signal 164b indicates whether or not the architected cb operand(s) from the control registers 72 (FIG. 2) should be used, based upon whether the signal 164b is deasserted or asserted, respectively. When the delayed valop signal 164b is asserted, the launch based latch signal 181b indicates whether the cb operand(s) provided by the RRs 44a should be used or whether the cb operand(s) should instead be bypassed and retrieved directly from the execution unit 42 that produces the cb operand(s).

The operand dependency logic 104 (FIG. 4) further includes valcb logic 104b, as illustrated in FIG. 6, for generating the valcb[0] signal 153a for the valdep/valop logic 104a (FIG. 5) as well as the valcb[1] signal 153b that is used to control propagation of the valcb[0] signal 153a. The valcb logic 104b of FIG. 6 essentially exists in parallel to the valdep/valop logic 104a (FIG. 5) within the operand dependency logic 104 (FIG. 4). As mentioned, the valcb[0] signal 153a is implemented for performance reasons so that dependent instructions are advised of a dependency clearing prior to retirement of their producer instructions, and the valcb[1] signal 153b is implemented for timing purposes relative to the valcb[0] signal.

Referring to FIG. 6, the valcb logic 104b of the local aslot 39a receives a valcb[0] signal 153a and a valcb[1] signal 153b from a previous adjacent aslot 39a and produces a new valcb[0] signal 153a and a new valcb[1] signal 153b for the next adjacent aslot 39a. The valcb[0] signal 153a indicates the status of the dependency, i.e., whether or not the cb dependency is asserted (or cleared). Moreover, the valcb[1] signal 153b enables propagation of the valcb[0] signal 153a to propagate a distance of two aslots 39a during each cycle. If a particular aslot 39a sets the cb dependency, then it kills the propagation of the valcb[0] signal 153a; otherwise, the valcb[0] signal 153a is permitted to propagate when asserted.

As is shown in FIG. 6, the valcb[0] signal 153a is passed to a latch 221 by actuation of a transistor 216, which is actuated by the clock CK 149. From the latch 221, the valcb[0] signal 222 is passed to an AND logic gate 223 along with a not set_cb (~set_cb) signal 136' by inversion of the signal 136 from the set_cb indicator 121 (FIG. 5) and the valid signal 166 from the launch control logic 102 (FIG. 4). The AND logic gate 223 asserts the valcb[1] signal 153b to the next aslot 39a when the signals 166, 222, and 136' are all asserted.

The valcb[1] signal 153b is passed to an AND logic gate 227 along with a ~set_cb signal 136' in order to generate an output 229 for propagation control purposes.

An AND logic gate 232 receives a launch delay signal 234 from the launch control logic 102 (FIG. 4), the set_cb signal 136 from the set_cb indicator 121 (FIG. 5), and a not abort (~abort) signal 236 from the launch control logic 102 (FIG. 4). The ~abort signal 236 is asserted when the producer instruction completes normally and is deasserted when the results of a current instruction are invalid. Based upon the foregoing signals, the AND logic gate 232 generates an output 238.

An OR logic gate 242 receives the output 225 from the AND logic gate 223, the output 229 from the AND logic gate 227, and the output 238 from the AND logic gate 232 in order to generate an OR logic output 244. The OR logic output 244 is passed through a transistor 246, upon actuation of the clock ~CK 149' and into a latch 252. The valcb[0] signal 153a is output by the latch 252.

Thus, as can be seen from the architecture in FIG. 6, an asserted valcb[0] signal 153a can be propagated through an aslot 39a or the valcb[0] signal 153a can be asserted by the local aslot 39a and propagated.

Figure 7:
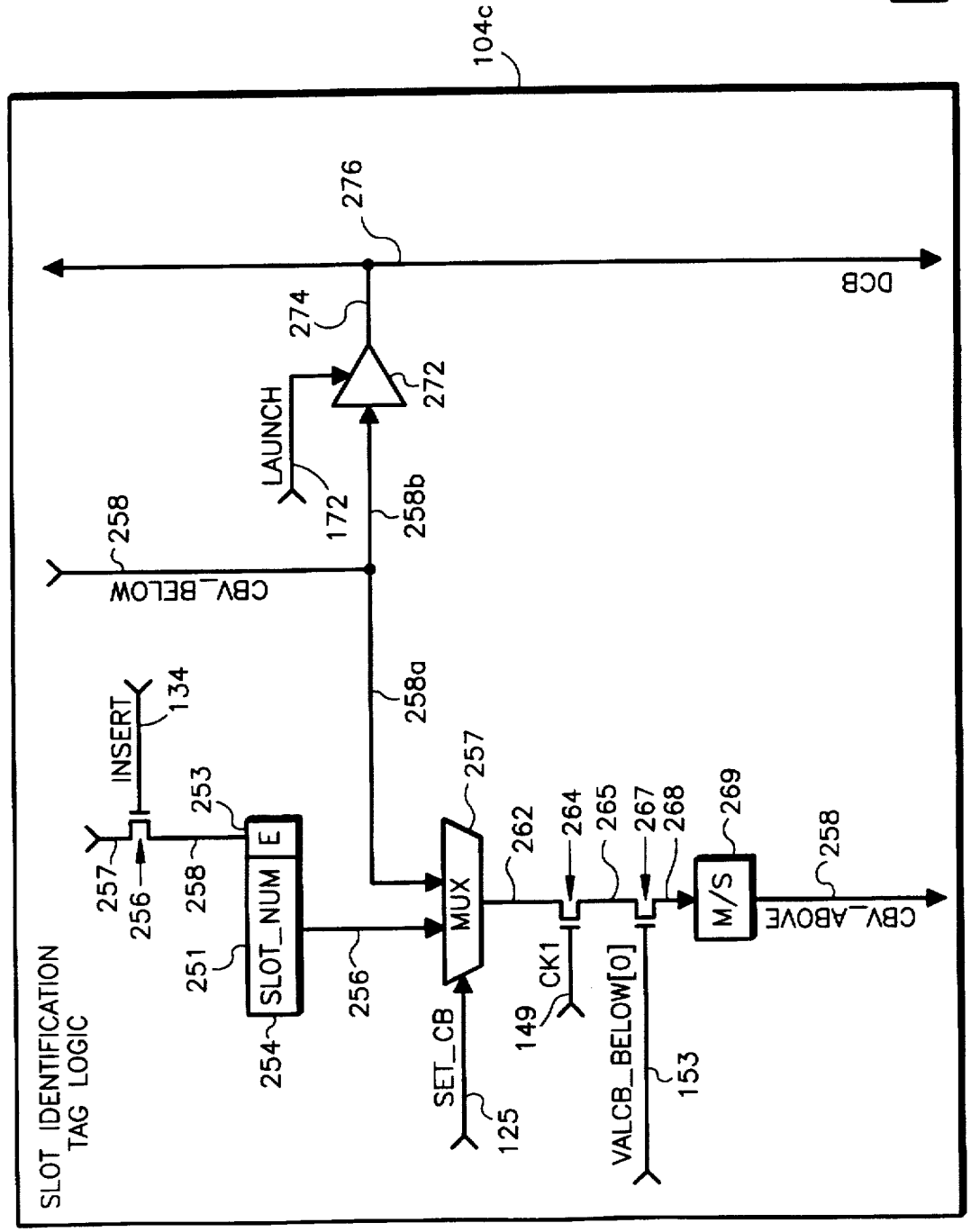
FIG. 7 is a block diagram of a possible implementation of slot identification tag logic situated within the operand dependency logic of FIG. 4 for propagating a slot tag corresponding with a producer instruction throughout the aqueue of FIGS. 2 and 3.
Figure 8:
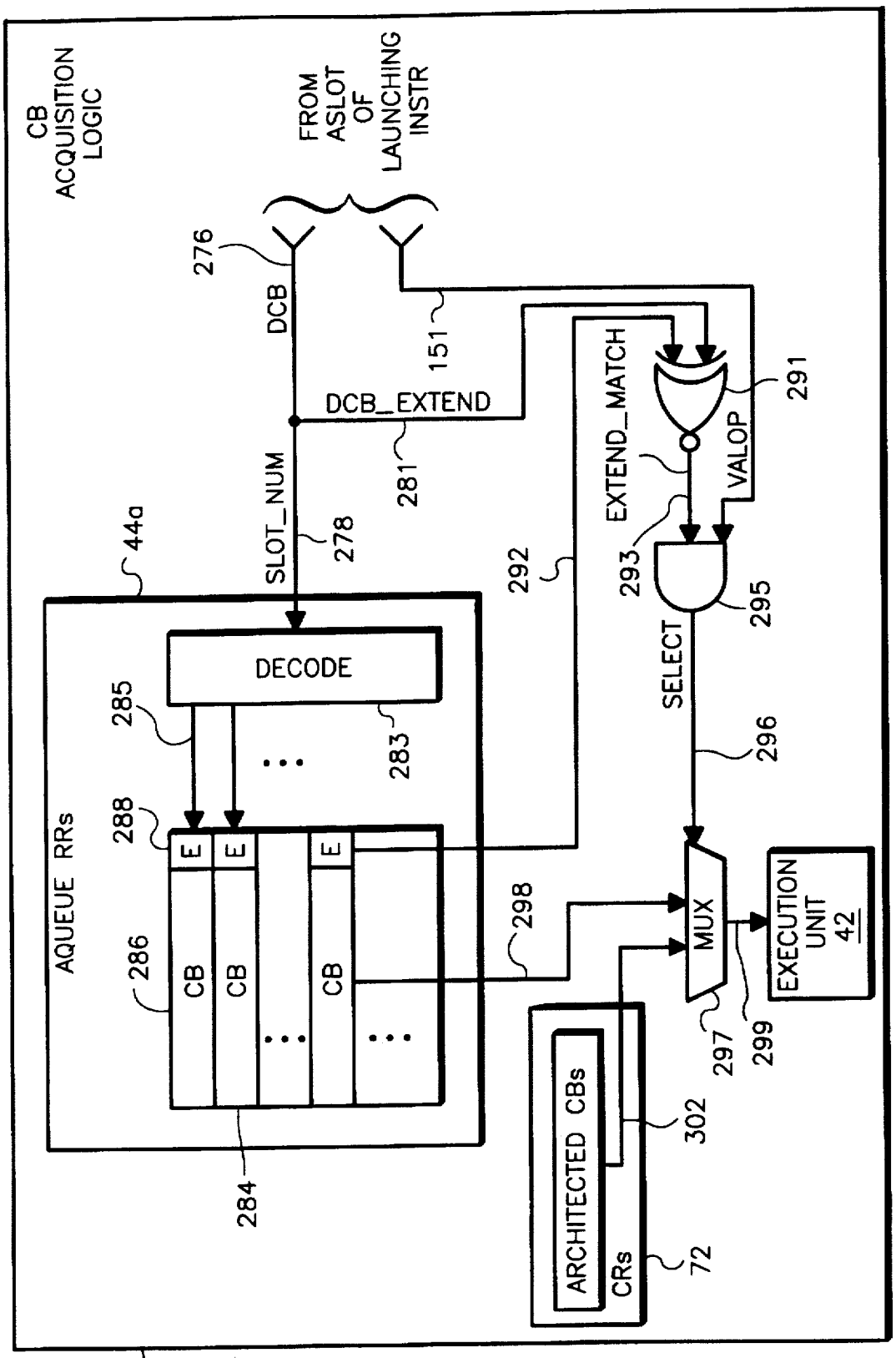
FIG. 8 is a block diagram of a possible implementation of cb acquisition logic situated within the aqueue of FIGS. 2 and 3 for permitting retrieval of cb operands by a dependent instruction.

FIG. 7 illustrates slot identification tag logic 104a that is implemented within the operand dependency logic 104 in order to keep track of and retrieve a cb operand when a cb dependency is cleared. In general, if a particular aslot 39a sets the cb dependency (i.e., includes the producer instruction), then the particular aslot 39a communicates an identification tag that comprises its slot number and an extend bit when the local aslot 39a launches its instruction. Each of the aslots 39a has a hard-wired slot number, and the extend bit is toggled between 1 and 0 and combined with the hard-wired slot number to uniquely identify each aslot 39a in the aqueue 38a. When dumped by the slot identification tag logic, the identification tag is sent to the RRs 44a (FIGS. 2 and 8). Further, if the local aslot 39a does not set the cb dependency, then the local aslot 39a will propagate the identification tag that was communicated to it to the next adjacent aslot 39a.

As shown in FIG. 7, a slot number 251 is provided by the logic 104c. In the preferred embodiment, the slot number 251 is hardwired. An extend bit 253 is inserted into a local register 254 upon insert of the local instruction by way of a transistor 256. The identification tag defined by the slot number 251 and extend bit 253 in the register 254 uniquely identifies the particular local aslot 39a within the aqueue 38a, thereby distinguishing the local aslot 39a from a subsequent use of the same aslot 39a for a later local instruction. The identification tag in the register 254 is fed to a multiplexer (MUX) 257, as indicated by reference arrow 256. The MUX 257 also receives a cbv signal 258 from the slot identification tag logic 104a of a previous adjacent aslot 39a. The MUX output 262 depends upon the set_cb signal 125. When the set_cb signal 125 is asserted, then the local instruction is setting cb, and the local identification tag in register 254 is passed to the MUX output 262. If the set_cb signal 125 is deasserted, then the slot identification tag on cbv connection 258 is passed to the MUX output 262.

The MUX output 262 is clocked via the clock CK 149 and the transistor 264. The transistor 264 is connected to transistor 267, which is clocked by the valcb[0] signal 153a. Further, the transistor 267 is connected to a m/s latch 269. The transistor 267 helps to control propagation of the slot number by limiting propagation to two aslots 39a per cycle. Finally, the m/s latch 269 produces the cbv signal 258 for the next aslot 39a.

When an instruction is launched in the local aslot 39a, the driver 272 drives the slot number on cbv connection 258 to a dcb connection 276. Essentially, the dcb connection 276 carries the slot identification tag to the RRs 44a to retrieve an operand. The slot identification tag is used as an address into the RRs 44a.

FIG. 8 illustrates cb acquisition logic 104c that is implemented in the integer data path 82 (FIG. 3). The cb acquisition logic 104c enables storage of cb operands and retrieval of cb operands when a dependency is cleared by a launching instruction. The cb operands are stored in either the aqueue RRs 44a when the producer instruction has not yet retired (still resides in the aqueue 38a) or in the CRs 72 when the producer instruction has already retired (and is not situated within the aqueue 38a).

In order to permit retrieval of cb operands from the aqueue RRs 44a, the aslot 39a containing the launching instruction passes the slot identification tag on the dcb connection 276 and the valop signal 151 to the cb acquisition logic 278 of FIG. 8. The slot number 278 from the dcb connection 276 is passed to the aqueue RRs 44a, and in particular, to a decode mechanism 283. The decode mechanism 283 decodes the slot number 278 and selects one of a plurality of registers 284 that contains the desired cb operand 286 with corresponding extend bit 288. The decode mechanism 283 selects registers 284 via corresponding select lines 285.

When a particular register 284 is selected by the decode mechanism 284, the extend bit 288 of the particular register 284 is passed to an exclusive-not-OR (XNOR) logic gate 291 as indicated by reference arrow 292 along with the dcb__extend bit 281. If the extend bits 281 and 288 match, then the cb operand in the register 284 will ultimately be passed to the execution unit 42, provided that the valop signal 151 is asserted. In this regard, the XNOR logic gate 291 will assert a match signal 293 that is combined with the valop signal 151 at an AND logic gate 295, which produces a select signal 296 that will pass the cb operand from a register 284 to the execution unit 42, as indicated by reference arrows 298, 299.

To the contrary, if the extend bits 281 and 292 do not match at the XNOR logic gate 291, then the cb operand is retrieved in the architected state within the CRs 72. In other words, the cb operand has been produced by a retired instruction. In this case, the architected cb operand is forwarded to the MUX 297, and the select signal 296 will select the architected cb operand to be communicated to the execution unit 42.

Furthermore, the extend bit 288 in the RRs 44a is updated when the corresponding cb operand 286 is updated.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. As another example, the invention could be employed to track other types of dependencies, aside from cb and sar operands. All such modifications and variations are intended to be included herein within the scope of the present invention, as is defined by the following claims. Finally, in the claims hereafter, the structures, materials, acts, and equivalents of all means-plus-function elements and all step-plus-function elements are intended to include any and all structures, materials, or acts for performing the specified functions.

Wherefore, the following is claimed:

1. A system for tracking operand dependencies among instructions in a processor, the processor having a reordering mechanism configured to execute the instructions out of order, the reordering mechanism comprising:

a plurality of slots for receiving respective instructions;

a set dependency latch in each said slot, said set dependency latch producing a set dependency signal that indicates whether a local instruction in a local slot is to produce operand data to be used by a remote dependent instruction that follows said local instruction in program order;

a use dependency latch in each said slot, said use dependency latch producing a use dependency signal that indicates whether said local instruction is to use operand data to be produced by a remote producer instruction that precedes said local instruction in said program order;

valid operand propagation logic in each said slot, said valid operand propagation logic configured to produce a valid operand signal for a following slot to indicate whether a producer instruction exists in said program order prior to a following instruction in said following slot;

valid dependent logic in each said slot, said valid dependent logic configured to prevent said local instruction from launching execution until after said remote producer instruction commences execution, based upon said use dependency signal and said valid operand signal from a previous slot; and wherein said valid operand propagation logics are configured collectively to propagate said valid operand signal successively through said slots.

2. The system of claim 1, wherein said operand data is a carry borrow value for an add operation.

3. The system of claim 1, wherein said operand data is a shift amount register value.

4. The system of claim 1, further comprising:

a fetch mechanism associated with said processor configured to fetch said instructions;

a sort mechanism configured to receive said instructions from said fetch mechanism and to identify arithmetic and memory instructions; and arithmetic and memory queues associated with said reordering mechanism, said arithmetic and memory queues configured to receive said arithmetic and memory instructions respectively from said sort mechanism, said arithmetic queue comprising said plurality of slots.

5. The system of claim 1, further comprising slot identification tag logic associated with each said slot, said slot identification tag logic configured to propagate a slot identification tag from a local slot to an adjacent remote slot when said dependent set signal is asserted in said local slot and configured to propagate a different slot identification tag received from another remote slot to said adjacent remote slot when said dependent set signal is deasserted.

6. The system of claim 1, further comprising a means for broadcasting said set dependency signal among each of said slots.

7. A system for tracking operand dependencies among instructions that are executed out of order, comprising:

a processor configured to execute said instructions out of order;

a reordering mechanism in said processor, said reordering mechanism comprising a plurality of slots for receiving respective instructions and for permitting execution of said instructions in an out of order sequence;

first logic in said reordering mechanism, said first logic configured to determine when a producer instruction in a producer instruction slot produces an operand that is to be used by a dependent instruction in a dependent instruction slot, said dependent instruction following said producer instruction in program order;

second logic in said reordering mechanism, said second logic configured to propagate a dependency signal successively through a plurality of said slots from said producer instruction slot to said dependent instruction slot; and third logic in said reordering mechanism, said third logic configured to prevent said dependent instruction from launching execution when said third logic receives said dependency signal, until after said producer instruction launches execution.

8. The system of claim 7, wherein said operand is a carry borrow value for an add operation.

9. The system of claim 7, wherein said operand is a shift amount register value.

10. The system of claim 7, further comprising:

a fetch mechanism in said processor, said fetch mechanism configured to fetch said instructions;

a sort mechanism configured to receive said instructions from said fetch mechanism and to identify arithmetic and memory instructions; and arithmetic and memory queues in said reordering mechanism, said arithmetic and memory queues configured to receive said arithmetic and memory instructions respectively from said sort mechanism, said arithmetic queue comprising said plurality of slots.

11. The system of claim 7, further comprising slot identification tag logic associated with each said slot, said slot identification tag logic configured to propagate a slot identification tag from a local slot to a following remote slot when said dependency signal is locally asserted by said local slot and configured to propagate a previous remote slot identification tag received from a previous remote slot to said following slot when said dependency signal is remotely asserted.

12. The system of claim 7, further comprising a means for determining and broadcasting when no producer instructions exist in any of said slots.

13. The system of claim 7, wherein each said slot comprises:

a set dependency latch in each said slot, said set dependency latch producing a set dependency signal that indicates whether a local instruction in a local slot is to produce operand data to be used by a remote dependent instruction that follows said local instruction in program order;

a use dependency latch in each said slot, said use dependency latch producing a use dependency signal that indicates whether said local instruction is to use operand data to be produced by a remote producer instruction that precedes said local instruction in said program order;

valid operand propagation logic in each said slot, said valid operand propagation logic configured to produce a valid operand signal for a following slot to indicate whether a producer instruction exists in said program order prior to a following instruction in said following slot; and valid dependent logic in each said slot, said valid dependent logic configured to prevent said local instruction from launching execution until after said remote producer instruction commences execution, based upon said use dependency signal and said valid operand signal from a previous slot.

14. A method for tracking operand dependencies among instructions in a processor that executes the instructions out of order, the processor comprising slots that receive respective instructions and permit the instructions to execute out of order, comprising the steps of:

determining that a first instruction in a first slot produces an operand that is to be used by a second instruction in a second slot, said second instruction following said first instruction in program order;

propagating a dependency signal successively through a plurality of said slots from said first slot to said second slot; and preventing said second instruction from launching execution when said second slot receives said dependency signal until after said first instruction launches execution.

15. The method of claim 14, wherein said operand comprises a carry borrow value.

16. The method of claim 14, wherein said operand comprises a shift amount register value.

17. The method of claim 14, wherein said first and second instructions define arithmetic operations.

18. The method of claim 14, further comprising the steps of:

determining when no producer instructions exist in any of said slots; and broadcasting a signal concurrently to said slots to indicate when no producer instructions exist in any of said slots.

19. The method of claim 14, further comprising the steps of:

producing a set dependency signal in each said slot that indicates whether a local instruction in a local slot is to produce operand data that is to be used by a remote dependent instruction that follows said local instruction in program order;

producing a use dependency signal that indicates whether said local instruction is to use operand data that is to be produced by a remote producer instruction that precedes said local instruction in said program order;

producing a valid operand signal for a following slot to indicate whether any producer instruction exists in said program order prior to a following instruction in said following slot; and preventing said local instruction from launching execution until after said remote producer instruction commences execution, based upon said use dependency signal and said valid operand signal from a previous slot.

20. The method of claim 19, further comprising the step of asserting said set dependency signal and said use dependency signal in each said slot when a divide step instruction is inserted in one of said slots.

21. A method for tracking operand dependencies among instructions in a processor that executes the instructions out of order, comprising the steps of:

placing said instructions in respective slots of a reordering mechanism and permitting execution of said instructions in an out of order sequence;

producing a set dependency signal in each said slot that indicates whether a local instruction in a local slot is to produce operand data that is to be used by a remote dependent instruction that follows said local instruction in program order;

producing a use dependency signal in each said slot that indicates whether said local instruction is to use operand data that is to be produced by a remote producer instruction that precedes said local instruction in said program order;

producing a valid operand signal in each said slot for a following slot to indicate whether any producer instruction exists in said program order prior to a following instruction in said following slot;

propagating said valid operand signal through a plurality of said slots in succession; and preventing one of said local instructions from launching execution until after a corresponding remote producer instruction commences execution, based upon said use dependency signal generated locally and said valid operand signal that is received from a previous slot.

22. The method of claim 21, wherein said operand data comprises a carry borrow for an add operation.

23. The method of claim 21, wherein said operand data comprises a shift amount register operation.

24. The method of claim 21, wherein said slots reside in an arithmetic queue having arithmetic instructions and not having memory instructions.

25. The method of claim 21, further comprising the step of asserting said set dependency signal and said use dependency signal in each said slot when a divide step instruction is inserted in one of said slots.

26. The method of claim 21, further comprising the steps of:

determining when no producer instructions exist in any of said slots; and broadcasting a signal concurrently to said slots to indicate when no producer instructions exist in any of said slots.

27. The method of claim 21, further comprising the step of asserting said set dependency signal and said use dependency signal in each said slot when a divide step instruction is inserted in one of said slots.

28. The method of claim 21, further comprising the steps of:

updating said valid dependency signal upon insert and retirement of said local instruction to and from said local slot respectively;

producing a second valid operand signal for said following slot to indicate whether said local instruction is to produce said operand data for said remote dependent instruction; and updating said second valid operand signal when said local instruction has completed execution, but prior to said retirement.

\* \* \* \* \*